United States Patent
Yari et al.

(10) Patent No.: US 8,035,919 B2
(45) Date of Patent: Oct. 11, 2011

(54) MULTI-CHANNEL THIN-FILM MAGNETIC HEAD, MAGNETIC TAPE DRIVE APPARATUS WITH THE MULTI-CHANNEL THIN-FILM MAGNETIC HEAD AND MANUFACTURING METHOD OF MULTI-CHANNEL THIN-FILM MAGNETIC HEAD

(75) Inventors: Seiji Yari, Tokyo (JP); Yasufumi Uno, Tokyo (JP); Yuji Ito, Tokyo (JP); Hideaki Sato, Tokyo (JP); Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 465 days.

(21) Appl. No.: 12/335,090

(22) Filed: Dec. 15, 2008

(65) Prior Publication Data

US 2010/0149685 A1    Jun. 17, 2010

(51) Int. Cl.
*G11B 5/29* (2006.01)
*G11B 5/027* (2006.01)
*G11B 5/127* (2006.01)

(52) U.S. Cl. ............................ 360/121; 360/83; 360/110

(58) Field of Classification Search .................... 360/83, 360/110, 121; 216/22; 427/127
See application file for complete search history.

(56) References Cited

U.S. PATENT DOCUMENTS

| | | | | |
|---|---|---|---|---|
| 5,353,182 A | * | 10/1994 | Nakamura et al. | 360/135 |
| 6,040,965 A | * | 3/2000 | Terunuma et al. | 360/122 |
| 6,303,205 B1 | * | 10/2001 | Tanaka et al. | 428/848.1 |

FOREIGN PATENT DOCUMENTS

| | | |
|---|---|---|
| JP | A-9-204625 | 8/1997 |
| JP | A-11-25413 | 1/1999 |
| JP | A-2002-251704 | 9/2002 |

* cited by examiner

*Primary Examiner* — Ly D Pham
(74) *Attorney, Agent, or Firm* — Oliff & Berridge, PLC

(57) ABSTRACT

A multi-channel thin-film magnetic head includes a substrate, a plurality of thin-film magnetic head elements formed on the substrate, a closure fixed onto the plurality of thin-film magnetic head elements, a protection film laminated on a whole area of a TBS of the plurality of thin-film magnetic head elements and the closure, and many micro-grooves formed in a surface of the protection film.

30 Claims, 14 Drawing Sheets

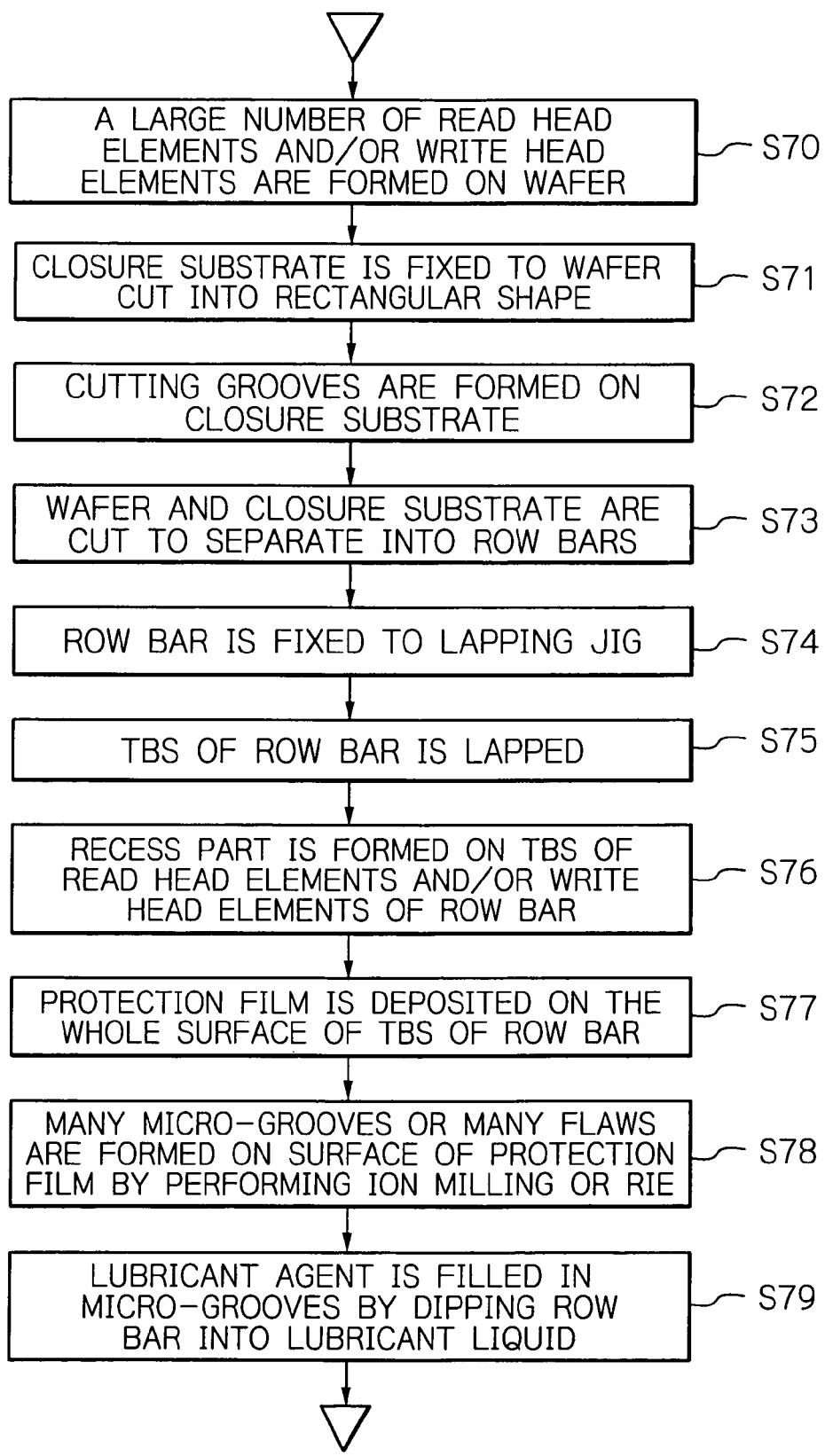

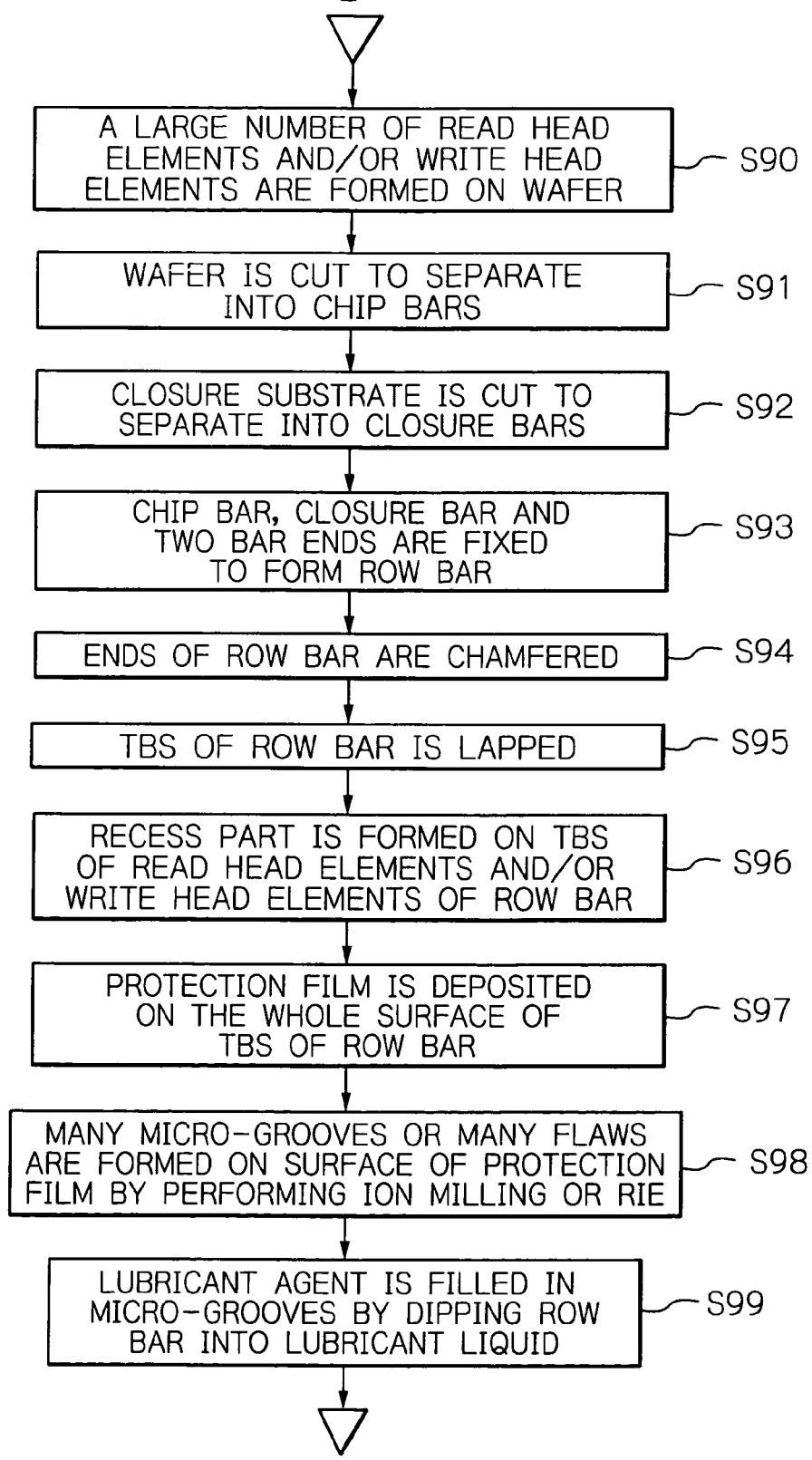

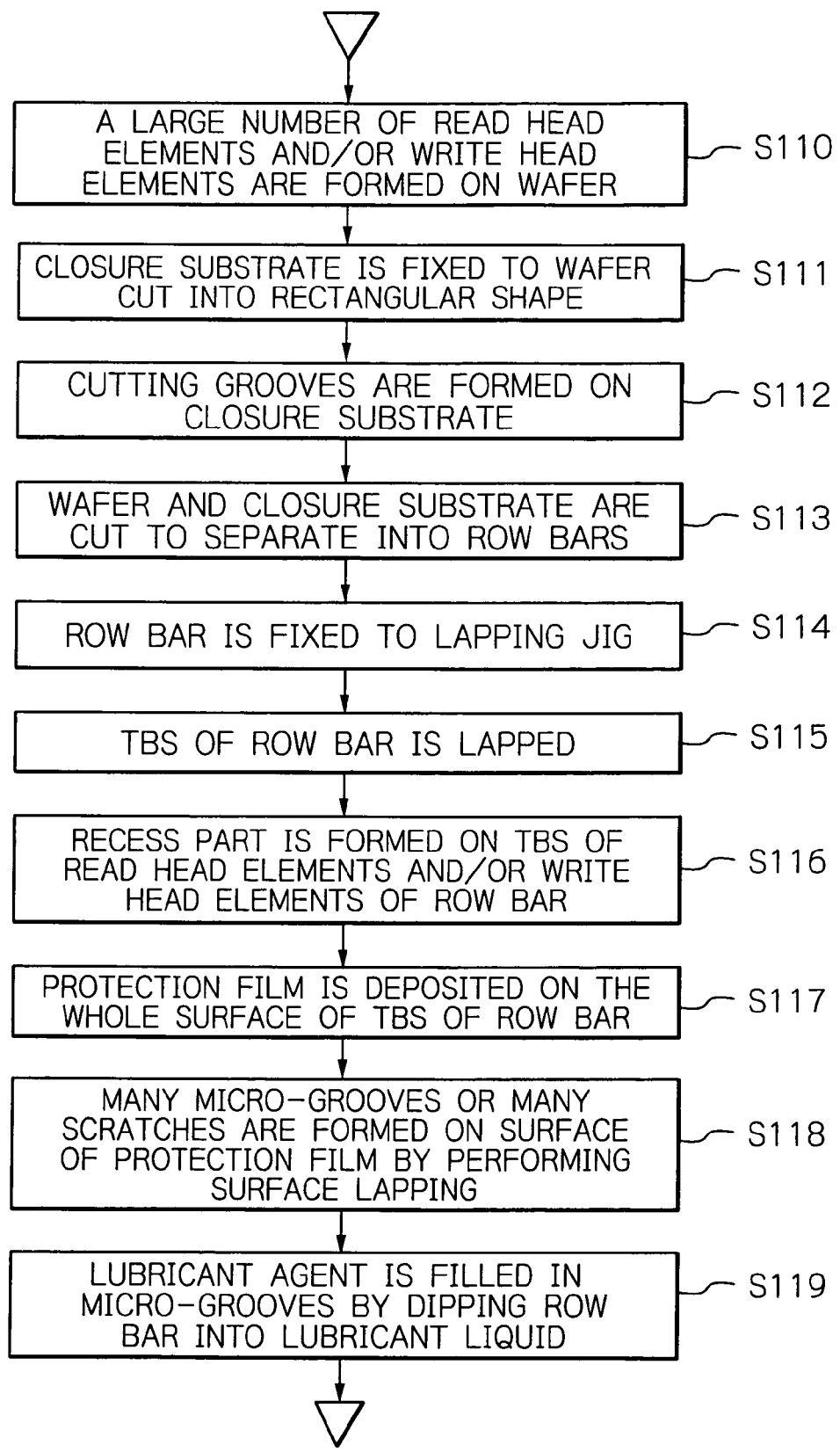

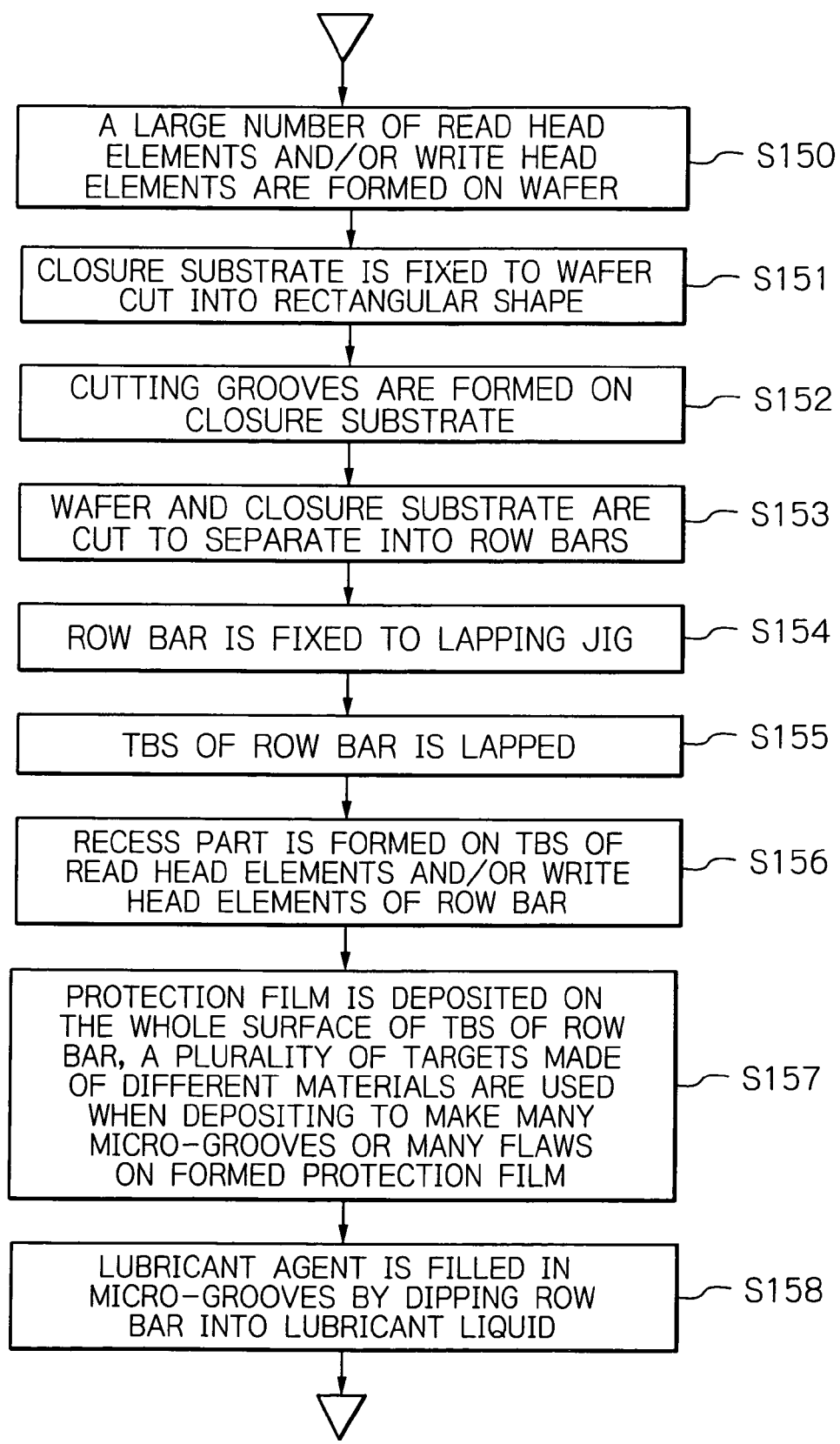

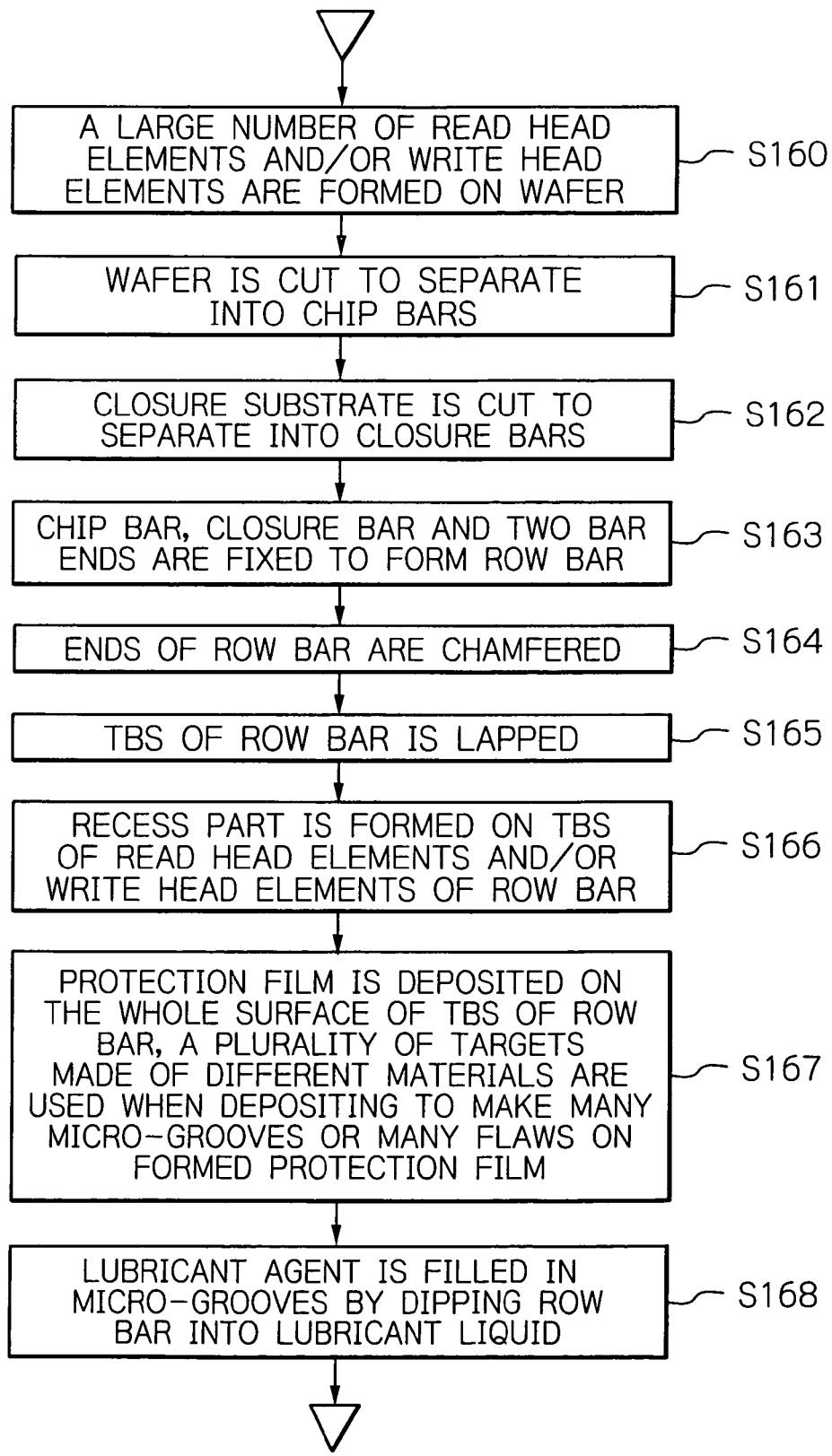

MULTI-CHANNEL THIN-FILM MAGNETIC HEAD, MAGNETIC TAPE DRIVE APPARATUS WITH THE MULTI-CHANNEL THIN-FILM MAGNETIC HEAD AND MANUFACTURING METHOD OF MULTI-CHANNEL THIN-FILM MAGNETIC HEAD

BACKGROUND OF THE INVENTION

1. Field of the Invention

The present invention relates to a multi-channel thin-film magnetic head, to a multi-channel magnetic tape drive apparatus with the multi-channel thin-film magnetic head, and to a manufacturing method of a multi-channel thin-film magnetic head.

2. Description of the Related Art

In the multi-channel magnetic tape drive apparatus, a multi-channel thin-film magnetic head with read head elements and write head elements for a large number of channels is provided. For example, in the multi-channel magnetic tape drive apparatus (the fourth generation) with the LTO (linear tape open) technical standard, a multi-channel thin-film magnetic head provided with read head elements of 16 channels, write head elements of 16 channels and servo magnetic head elements of 2 channels is used.

Recently, with enhancement in the performance of the multi-channel magnetic tape drive apparatus, required is adoption of high performance multi-channel thin film magnetic head. Thus, an inductive write head element is used as the write head element of each channel and also a giant magnetoresistive effect (GMR) read head element is put to practical use as the read head element of each channel, and demand for high output read head element becomes more increased.

In order to expect stable travel of the magnetic tape in the magnetic tape drive apparatus, it is necessary to optimize a receiving area and a receiving angle of a tape support member for supporting the traveling tape and also to apply a suitable tension to the traveling tape. For example, if the receiving area for supporting the traveling magnetic tape is decreased, a frictional force between the magnetic tape and the magnetic head lowers to provide stable travel of magnetic tape for a short term. However, since the load concentrates to the small receiving region, abrasion occurs in this region to make difficult a stable traveling of the magnetic tape for a long term. Also, in case that some kind of particles exist between a TBS (tape bearing surface) of the magnetic tape and the magnetic head, an influence of these particles increases and sudden deterioration of the head occurs even though an area of contact is reduced.

In a thin-film magnetic head with GMR read head elements, a protection layer is coated on its TBS so as to increase a resistance property of the GMR read head element against corrosion. However, when a traveling magnetic tape makes in contact with both a material coated as the protection film and a material constituting the TBS, the tape intensively grinds down either the protection film or the TBS (in general, the protection film will be easily ground), and thus it is difficult to expect a stable traveling of the magnetic tape for a long term.

SUMMARY OF THE INVENTION

It is therefore an object of the present invention to provide a multi-channel thin-film magnetic head, a multi-channel magnetic tape drive apparatus and a manufacturing method of a multi-channel thin-film magnetic head, whereby a stable traveling of the magnetic tape for a long term can be expected.

According to the present invention, a multi-channel thin-film magnetic head includes a substrate, a plurality of thin-film magnetic head elements formed on the substrate, a closure fixed onto the plurality of thin-film magnetic head elements, a protection film laminated on a whole area of a TBS of the plurality of thin-film magnetic head elements and the closure, and many micro-grooves formed in a surface of the protection film.

The protection film is formed or deposited on the whole area of the TBS, and many micro-grooves running in random directions are formed on the surface of the protection film. Thus, the contact state between the magnetic tape and the magnetic head changes from a surface contact to a point contact to substantially decrease their touch area without changing the overlapping area of the magnetic tape and the magnetic head so much. As a result, a static frictional force or stiction lowers and therefore stable travel of the magnetic tape in the long term can be expected.

It is preferred that the many micro-grooves are many micro-grooves running in random directions.

It is also preferred that the multi-channel thin-film magnetic head further includes a lubricant agent filled in the many micro-grooves. In this case, preferably, the lubricant agent includes fluorine or higher fatty acid. Since the lubricant agent is filled in the micro-grooves, when the environment temperature rises, this lubricant agent will seep out from the micro-grooves resulting the friction force between the protection film and the magnetic tape to more reduce.

It is further preferred that the protection film is made of DLC (diamond like carbon), $Al_2O_3$ (aluminum oxide, alumina), SiON (silicon oxynitride), LaSiON (lanthanum silicon oxynitride), HfSiON (hafnium silicon oxynitride), AlSiON (aluminum silicon oxynitride) or SrSiON (strontium silicon oxynitride)

It is still further preferred that the plurality of thin-film magnetic head elements include a plurality of magnetoresistive effect (MR) read head elements and/or a plurality of inductive write head elements. In this case, preferably, each of the plurality of MR read head elements includes a GMR read head element or a tunnel magnetoresistive effect (TMR) read head element.

According to the present invention, also, a multi-channel magnetic tape drive apparatus includes the aforementioned multi-channel thin-film magnetic head, a magnetic tape facing to the multi-channel thin-film magnetic head, and a drive system for relatively moving the magnetic tape and the multi-channel thin-film magnetic head.

According to the present invention, further, a manufacturing method of a multi-channel thin-film magnetic head, includes a step of forming a plurality of thin-film magnetic head elements formed on a substrate, a step of fixing a closure fixed onto the plurality of thin-film magnetic head elements of the substrate, a step of forming a row bar with the thin-film magnetic head elements aligned along a longitudinal direction of the row bar, by cutting the substrate and the closure fixed to the substrate, and a step of forming a protection film on a whole area of a TBS of the row bar, many micro-grooves running in random directions being formed on a surface of the protection film.

According to the present invention, still further, a manufacturing method of a multi-channel thin-film magnetic head, includes a step of forming a plurality of thin-film magnetic head elements formed on a substrate, a step of forming a chip bar with the thin-film magnetic head elements aligned along a longitudinal direction of the chip bar, by cutting the substrate, a step of fixing a closure bar to the chip bar to form a row bar, and a step of forming a protection film on a whole area of a TBS of the row bar, many micro-grooves running in random directions being formed on a surface of the protection film.

It is preferred that the protection film forming step includes forming many micro-grooves on a basic surface of the TBS by performing etching, and forming the many micro-grooves on the surface of the protection film by depositing the protection film on the basic surface with the formed many micro-grooves.

It is also preferred that the protection film forming step includes depositing a protection film using a plurality of targets made of a plurality of different kinds of materials to control the growth of crystal grains so as to form the many micro-grooves on the surface of the protection film.

It is further preferred that the protection film forming step includes depositing a protection film, and then forming the many micro-grooves on the surface of the deposited protection film by performing ion milling or etching.

It is still further preferred that the protection film forming step includes depositing a protection film, and then forming the many micro-grooves on the surface of the deposited protection film by performing surface lapping.

It is further preferred that the manufacturing method further includes a step of filling a lubricant agent in the many micro-grooves. In this case, preferably, the lubricant agent includes fluorine or higher fatty acid.

It is further preferred that the protection film is made of DLC, $Al_2O_3$, SiON, LaSiON, HfSiON, AlSiON or SrSiON.

Further objects and advantages of the present invention will be apparent from the following description of the preferred embodiments of the invention as illustrated in the accompanying drawings.

BRIEF DESCRIPTION OF THE DRAWINGS

FIG. 7 is a flow chart illustrating an example of a manufacturing process of the multi-channel thin-film magnetic head shown in FIG. 1;

FIG. 9 is a flow chart illustrating another example of a manufacturing process of the multi-channel thin-film magnetic head shown in FIG. 1;

FIG. 11 is a flow chart illustrating further example of a manufacturing process of the multi-channel thin-film magnetic head shown in FIG. 1;

FIG. 15 is a flow chart illustrating further example of a manufacturing process of the multi-channel thin-film magnetic head shown in FIG. 1; and FIG. 16 is a flow chart illustrating further example of a manufacturing process of the multi-channel thin-film magnetic head shown in FIG. 1.

DESCRIPTION OF THE PREFERRED EMBODIMENTS

Figure 1:
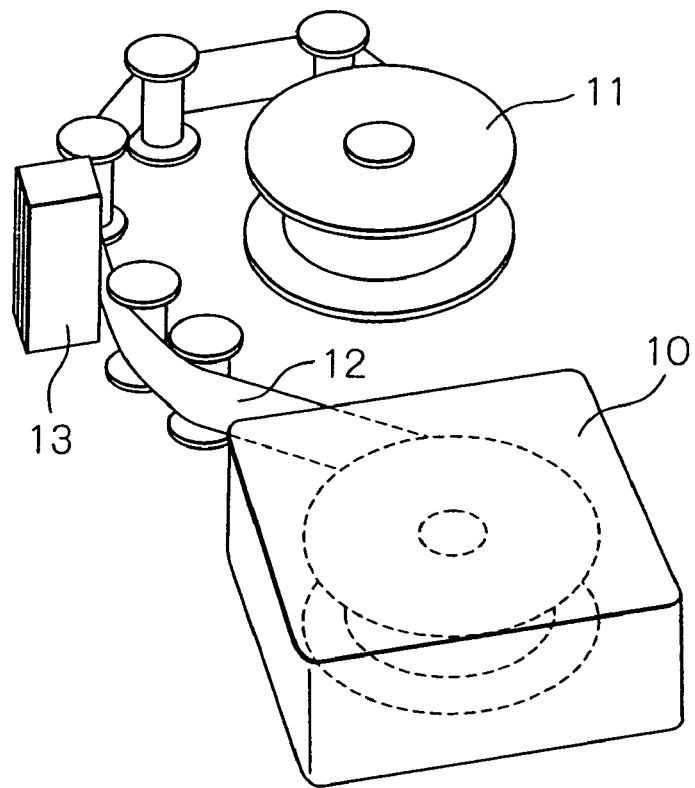
FIG. 1 is a perspective view schematically illustrating constitution of a multi-channel magnetic tape drive apparatus as an embodiment according to the present invention.
Figure 2:
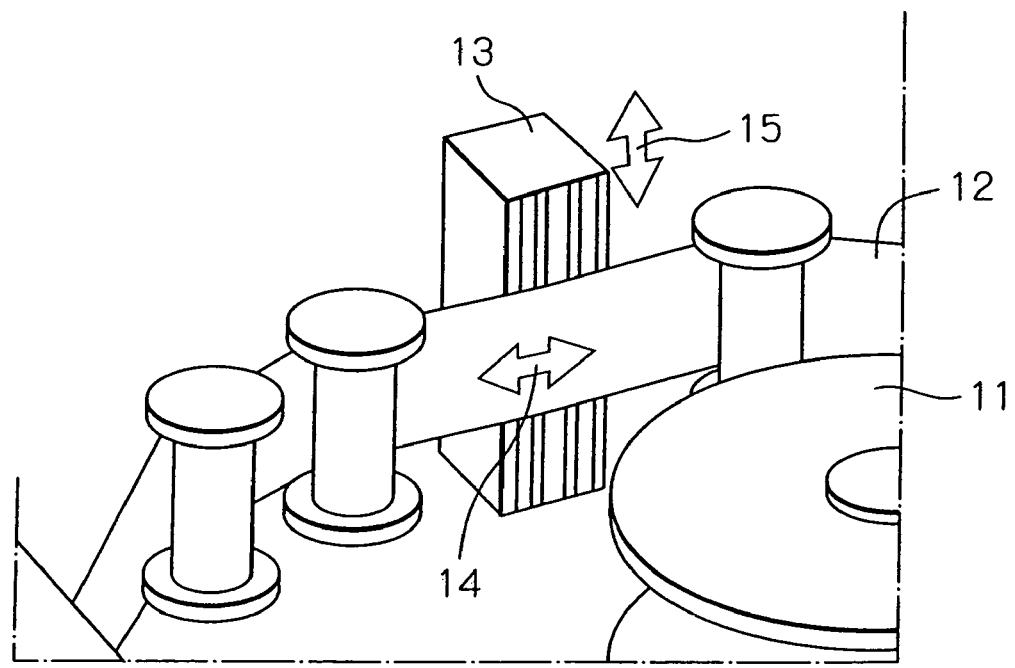
FIG. 2 is an enlarged perspective view illustrating constitution of the multi-channel thin-film magnetic head shown in FIG. 1 and its peripheral portion.

FIG. 1 schematically illustrates constitution of a multi-channel magnetic tape drive apparatus as an embodiment according to the present invention, and FIG. 2 illustrates constitution of the multi-channel thin-film magnetic head shown in FIG. 1 and its peripheral portion.

In this embodiment, applied is the present invention to a LTO multi-channel magnetic tape drive apparatus of the fourth generation. Of course, the present invention is not limited to the multi-channel magnetic tape drive apparatus of LTO but is applicable to any kind of multi-channel magnetic tape drive apparatus.

In FIGS. 1 and 2, a reference numeral 10 denotes a tape cartridge with a single reel, 11 denotes a take-up reel for temporarily rewinding a multi-channel magnetic tape 12 drawn out from the tape cartridge 10, and 13 denotes a multi-channel thin-film magnetic head, respectively. The multi-channel thin-film magnetic head 13 can reciprocate in directions or track-width directions 15 perpendicular to reciprocating running directions 14 of the multi-channel magnetic tape 12.

As is known in the art, in LTO, write and read operations are performed to and from the multi-channel magnetic tape 12 of the half-inch width. The multi-channel thin film magnetic head 13 for this purpose is provided with magnetic read head elements of 16 channels, magnetic write head elements of 16 channels and magnetic servo head elements of 2 channels.

Figure 3:
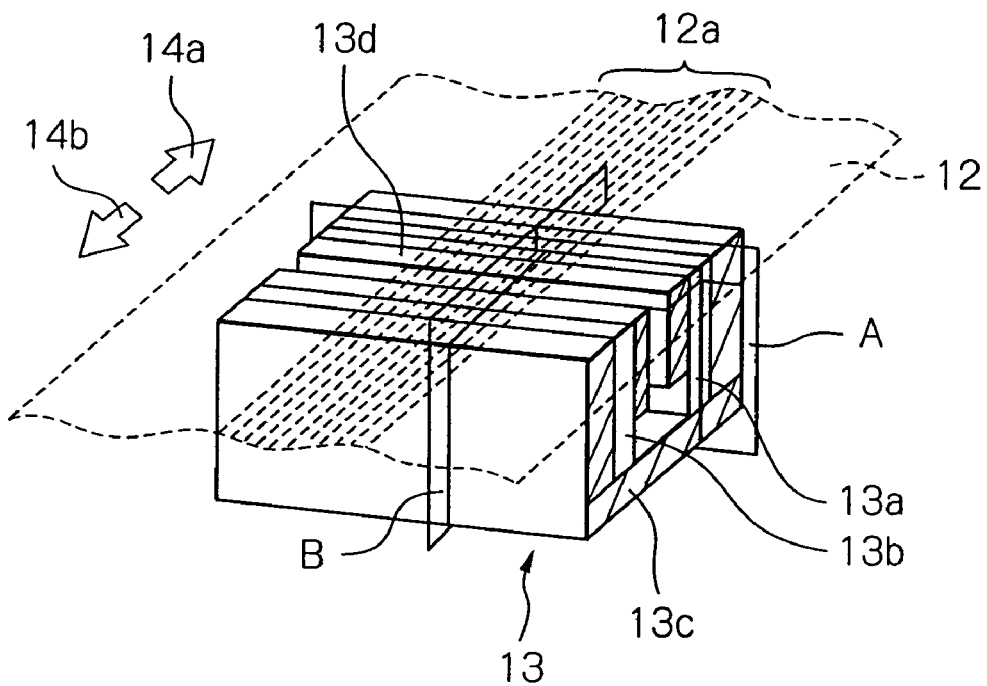
FIG. 3 is a perspective view schematically illustrating relative constitution between the multi-channel thin film magnetic head and a multi-channel magnetic tape, shown in FIG. 1.

FIG. 3 schematically illustrates relative constitution between the multi-channel thin film magnetic head 13 and the multi-channel magnetic tape 12, shown in FIG. 1.

As shown in the figure, the multi-channel magnetic tape 12 has a plurality of tracks 12a. Also, the multi-channel thin-film magnetic head 13 has a first head section 13a, a second head section 13b and a frame 13c for supporting the both head sections. When performing write and read operations, the magnetic tape 12 moves in direction of arrow 14a or arrow 14b. The write and read operations of data signal with respect to the tracks 12a of the magnetic tape 12 are performed under the state where a TBS 13d of the thin-film magnetic head 13 is in contact with the surface of the moving magnetic tape 12. When the magnetic tape 12 moves to the direction of arrow 14a, for example, read operation is performed in trailing side first head section 13a and write operation is performed in leading side second head section 13b. Whereas when the magnetic tape 12 moves to the opposite direction of arrow 14b, read and written head sections are replaced. In modifications of the present invention, only one of the first and second head sections 13a and 13b may be provided in the thin-film magnetic head 13.

Figure 4:
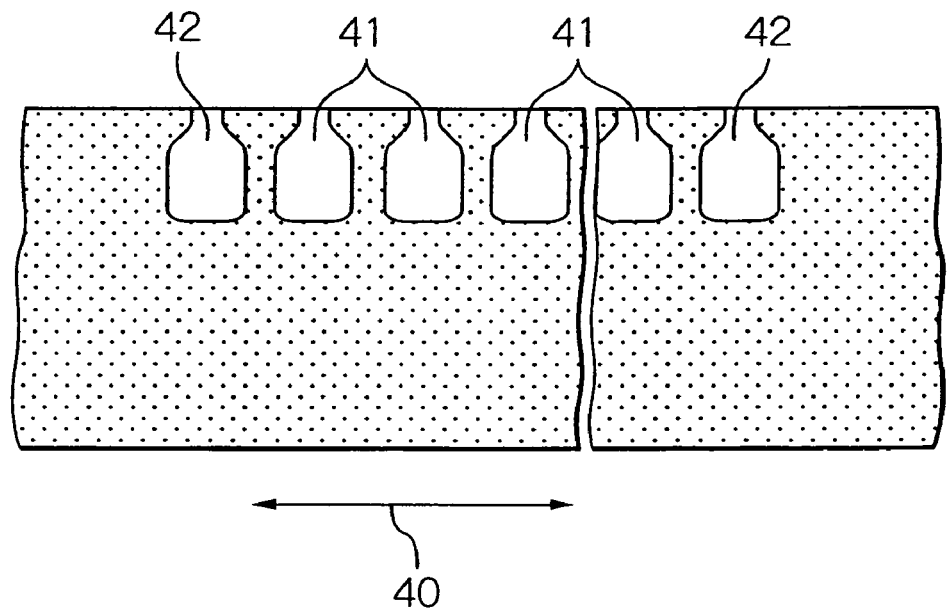
FIG. 4 is a sectional view along a plane section A shown in FIG. 3, illustrating internal configuration of the multi-channel thin film magnetic head shown in FIG. 1.
Figure 5:
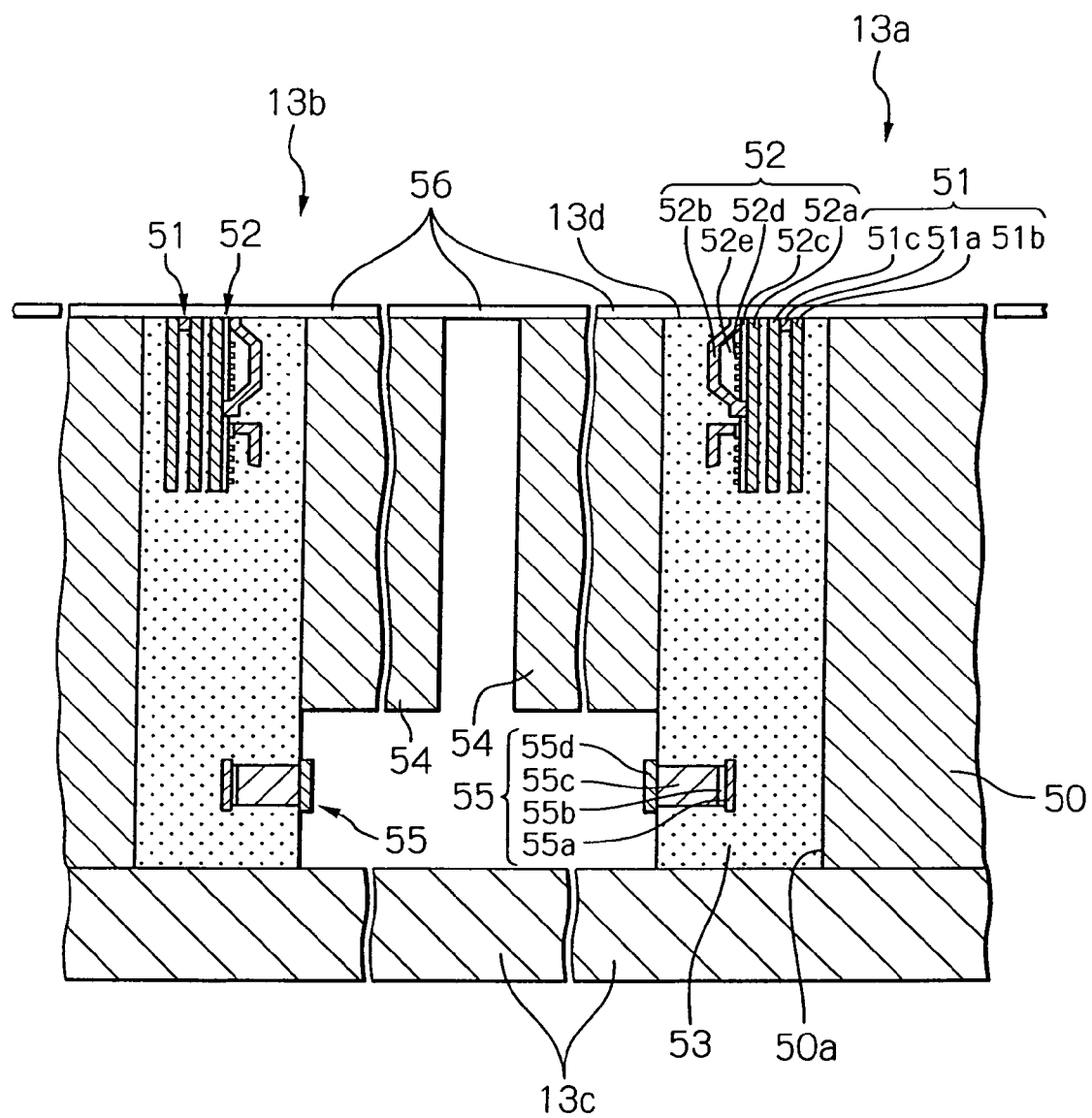
FIG. 5 is a sectional view along a plane section B shown in FIG. 3, illustrating the internal configuration of the multi-channel thin film magnetic head shown in FIG. 1.
Figure 6:
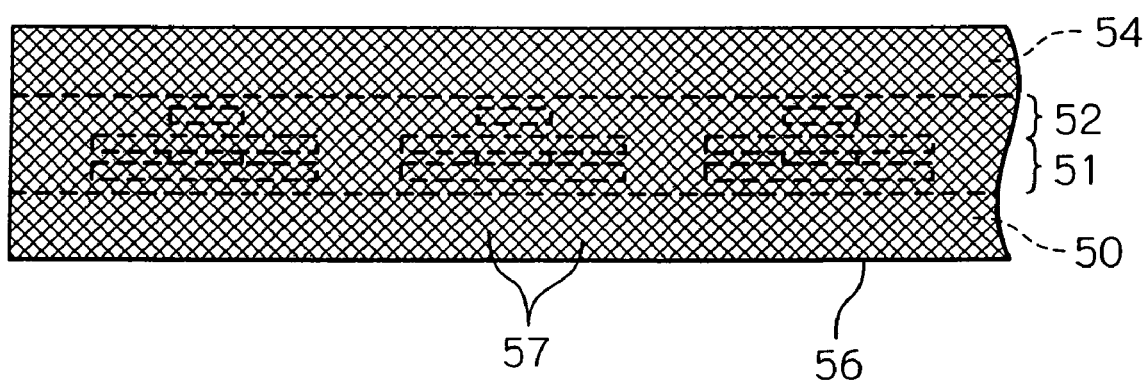
FIG. 6 is a plane view, seen from the TBS side, illustrating constitution of the multi-channel thin-film magnetic head shown in FIG. 1.

FIGS. 4 and 5 illustrate internal configuration of the multi-channel thin film magnetic head shown in FIG. 1. In particular, FIG. 4 shows a section along a plane section A of FIG. 3 and FIG. 5 shows a section along a plane section B of FIG. 3. FIG. 6 shows an outer view, seen from the TBS side, of the first head section 13a of the multi-channel thin-film magnetic head 13 shown in FIG. 1. Because the first head section 13a and the second head section 13b of the thin-film magnetic head 13 are opposed each other in the direction along the tracks and they have the similar constitution to each other, hereinafter explanation will be performed for the first head section 13a only.

As partially shown in FIG. 4, the thin-film magnetic head 13 has magnetic head elements 41 consisting of magnetic read head elements and magnetic write head elements of 16 channels and magnetic servo head elements 42 of 2 channels, aligned along the track-width direction 40 that is perpendicular to a running direction of the magnetic tape 12, formed on an element forming surface 50a of a head substrate 50, which is perpendicular to the TBS 13d.

As shown in FIG. 5, the first section 13a of the thin-film magnetic head 13 has the head substrate 50 made of for example AlTiC (Al$_2$O$_3$—TiC), GMR read head elements 51 formed on the element forming surface 50a for reading out data signal, inductive write head elements 52 formed just on the GMR read head elements 51 for writing the data signal, a protection layer 53 formed on the element forming surface 50a to cover these GMR read head elements 51 and inductive write head elements 52, a closure 54 made of for example AlTiC and adhered to the protection layer 53, and a plurality of terminal electrodes 55 formed on an exposed area of an upper surface of the protection layer 53, to which area no closure 54 is adhered.

Particularly, in this embodiment, a protection film 56 is formed or deposited on the whole area of the TBS 13d of the head substrate 50, of the GMR read head elements 51 and the inductive write head elements 52 formed thereon, and of the closure 54, and many micro-grooves or many flaws 57 running in random directions are formed on a surface of the protection film 56 as shown in FIG. 6.

The protection film 56 may be made of DLC, Al$_2$O$_3$, or SiON family material such as for example SiON, LaSiON, HfSiON, AlSiON or SrSiON. In particular, when SrSiON is used as the protection film, not only a certain hardness but also an advantage that a friction coefficient is hard to greatly change depending upon a change in the load can be obtained. Also, it is desired that a lubricant agent such as fluorine or higher fatty acid is filled in the micro-grooves 57. By filling such lubricant agent in the micro-grooves 57, when an environment temperature rises, this lubricant agent will seep out from the micro-grooves 57 and spread over the surface of the protection film 56 resulting the friction force between this protection film and the magnetic tape to more reduce.

It should be noted that, in the section shown in FIG. 5, only one magnetic head element consisting of the GMR read head element 51 and the inductive write head element 52 is revealed for each of the first and second head sections 13a and 13b.

The plurality of GMR read head elements 51 are electrically connected to the plurality of terminal electrodes 55, respectively. Also, one ends of each GMR read head element 51 and each inductive write head element 52 are arranged to reach the TBS 13d and to come in contact with the relatively moving magnetic tape 12. Therefore, during writing operation, the inductive write head elements 52 apply signal magnetic fields to the respective tracks of the moving magnetic tape 12 to write data thereto, and during read operation, the GMR read head elements 51 receive signal magnetic fields from the respective tracks of the moving magnetic tape 12 to read data there from.

Each of the GMR read head elements 51 includes, as shown in FIG. 5, a GMR multi-layered structure 51a, and a pair of a lower shield layer 51b and an upper shield layer 51c arranged to sandwich the GMR multi-layered structure 51a. The lower shield layer 51b and the upper shield layer 51c prevent the GMR multi-layered structure 51a from receiving external magnetic field or noise. Each of these lower shield layer 51b and upper shield layer 51c is formed, by using for example a frame plating method or a sputtering method, from a single layer or multilayer of soft magnetic materials such as FeSiAl (Sendust), NiFe (permalloy), CoFeNi (cobalt-iron-nickel), CoFe (cobalt-iron), FeN (iron nitride), FeZrN (iron-zirconium nitride) or CoZrTaCr (cobalt-zirconium-tantalum-chrome), with a thickness of about 0.5-3.0 μm.

The GMR multi-layered structure 51a constitutes a magnetic sensitivity portion for detecting a signal magnetic field by utilizing the giant magnetoresistive effect. Instead of the GMR multi-layered structure 51a, an anisotropic magnetoresistive effect (AMR) structure utilizing anisotropic magnetoresistive effect or a TMR multi-layered structure utilizing tunneling magnetoresistive effect may be used. In case of the GMR multi-layered structure, either current in plane (CIP) type GMR multi-layered structure or current perpendicular to plane (CPP) type GMR multi-layered structure may be adopted. The GMR multi-layered structure 51a will receive a signal magnetic field from each track 12a of the magnetic tape 12 with high sensitivity. In case that the GMR multi-layered structure 51a is the CPP-GMR multi-layered structure or that a TMR multi-layered structure is used instead of the GMR multi-layered structure, the lower shield layer 51b and the upper shield layer 51c serve as electrodes. On the other hand, in case that the GMR multi-layered structure 51a is the CIP-GMR multi-layered structure or that an AMR structure is used in stead of the GMR multi-layered structure, it is provided with insulation layers between the CIP-GMR multi-layered structure or the AMR structure and the lower and upper shield layers 51b and 51c, respectively and also it is provided with MR lead layers electrically connected to the CIP-GMR multi-layered structure or the AMR structure.

Each of the inductive write head elements 52 includes, as shown in FIG. 5, a lower magnetic pole layer 52a, an upper magnetic pole layer 52b, a write gap layer 52c with an end section near the TBS 13d, sandwiched between the lower magnetic pole layer 52a and the upper magnetic pole layer 52b near the TBS 13d, a write coil layer 52d formed to pass through at each turn between at least the lower magnetic pole layer 52a and the upper magnetic pole layer 52b, and a coil insulating layer 52e for insulating the write coil layer 52d from the lower magnetic pole layer 52a and the upper magnetic pole layer 52b.

The lower magnetic pole layer 52a and the upper magnetic pole layer 52b function as a magnetic path of magnetic flux produced from the write coil layer 52d and also sandwich by their end sections the TBS side end section of the write gap layer 52c. The write operation is performed by means of leakage flux output from the sandwiched end section of the write gap layer 52c. In the figure, it is depicted that the write coil layer 52d has a single layer structure. However, in modifications, the write coil layer may have a multi-layered structure or a helical coil structure. Also, in modifications, a single common magnetic layer may serve as both the upper shield layer 51c of the GMR read head element 51 and the lower magnetic pole layer 52a of the inductive write head element 52 laminated on the GMR read head element 51.

The lower magnetic pole layer 52a is formed, by using for example a frame plating method or a sputtering method, from a single layer or multilayer of soft magnetic materials such as NiFe, CoFeNi, CoFe, FeN, FeZrN or CoZrTaCr, with a thickness of about 0.5-3.0 µm. The write gap layer 52c is formed, by using for example a sputtering method or a chemical vapor deposition (CVD) method, from a nonmagnetic insulating material such as $Al_2O_3$, $SiO_2$ (silicon dioxide), AlN (aluminum nitride) or DLC, with a thickness of about 0.01-0.05 µm. The write coil layer 52d is formed, by using for example a frame plating method or a sputtering method, from a conductive material such as Cu, with a thickness of about 0.5-5.0 µm. The coil insulation layer 52e is formed, by using for example a photolithography method, from a resin insulation material cured by heating, such as a novolac photoresist, with a thickness of about 0.7-7.0 µm. The upper magnetic pole layer 51c is formed, by using for example a frame plating method or a sputtering method, from a single layer or multilayer of soft magnetic materials such as NiFe, CoFeNi, CoFe, FeN, FeZrN or CoZrTaCr, with a thickness of about 0.5-3.0 µm. Also, the protection layer 53 is formed, by using for example a sputtering method or a CVD method, from a nonmagnetic insulating material such as $Al_2O_3$, $SiO_2$, AlN or DLC.

Each of the terminal electrodes 55 includes a drawing electrode 55a, an electrode film 55b, a bump 55c and a pad 55d. The drawing electrodes 55a are electrically connected to lead lines from the GMR read head element 51 and from the inductive write head element 52. On each drawing electrode 55a, the electrode film 55b having conductivity is laminated, and the bump 55c is formed on the electrode film 55b by plating using this film 55b as an electrode for plating. The electrode film 55b and the bump 55c are made of a conductive material such as Cu. A thickness of the electrode film 55b is for example about 10-200 nm, and a thickness of the bump 55c is for example about 5-30 µm. A top end of the bump 55c is exposed from the top surface of the protection layer 53, and the pad 55d is laminated on this top end of the bump 55c.

As is described, according to this embodiment, the protection film 56 is formed or deposited on the whole area of the TBS 13d of the head substrate 50, the GMR read head elements 51 and the inductive write head elements 52, and the closure 54, and the many micro-grooves or many flaws 57 running in random directions are formed on the surface of the protection film 56. Thus, the contact state between the magnetic tape and the magnetic head changes from a surface contact to a point contact to substantially decrease their touch area without changing the overlapping area of the magnetic tape and the magnetic head so much. As a result, a static frictional force or stiction lowers and therefore stable travel of the magnetic tape in the long term can be expected.

A wear volume V is given from V=kWL/H, where k is a wearing coefficient, W is a friction force, L is a used length or a distance of actual travel of the magnetic tape, and H is a wearing resistance of the surface. As will be noted from this equation, when the wearing resistance increases, the wear volume V reduces to make stable travel of the magnetic tape. This wearing resistance H depends upon materials, shapes and touch area of both members come into contact with each other. According to this embodiment, the many micro-grooves or many flaws 57 are formed on the surface of the protection film 56 to change the contact state from a surface contact to a point contact so as to substantially decrease the touch area between the magnetic tape and the magnetic head without changing the overlapping area thereof as much as possible. Thus, it is possible to prevent local load from being applied to the magnetic tape resulting that the stiction can be decreased and stable travel of the magnetic tape in the long term can be expected. Because the stiction will intricately change when particles are produced between the magnetic tape and the TBS of the magnetic head, it is required to use for the protection film a material that has a high abrasion resistance and is hard to be chipped. That is, in order to keep a stable travel of the magnetic tape in a long term, it is important to reduce the touch area and to provide a state wherein no particle is produced or produced particles are captured even if they are produced.

Also, according to this embodiment, since the lubricant agent is filled in the micro-grooves or the flaws 57, when the environment temperature rises, this lubricant agent will seep out from the micro-grooves 57 resulting the friction force between this protection film and the magnetic tape to more reduce.

As for the protection film 56, it is desired to use a material that may produce, due to the friction, particles with small grain sizes capable of being caught within the micro-grooves 57.

The best desirable material for the protection film 56 is SrSiON. If the protection film 56 is made of SrSiON, as aforementioned, not only a certain hardness but also an advantage that a friction coefficient is hard to greatly change depending upon a change in the load can be obtained.

Table 1 indicates the measured result of friction coefficients with respect to applied loads as for various abrasion-resistant films.

TABLE 1

| Abrasion-resistant film | Film thickness (nm) | Friction coefficient | | | | Change in friction coefficient $\Delta = 3N - 10N$ |
| --- | --- | --- | --- | --- | --- | --- |
| | | Load of 3N | Load of 5N | Load of 10N | Load of 20N | |
| DLC | 1000 | 0.163 | 0.1702 | 0.1875 | 0.1803 | −0.024 |
| Ta—SiC | 1000 | 0.672 | 0.3208 | 0.33 | 0.2655 | 0.342 |
| SrSiON | 4800 | 0.673 | 0.5316 | 0.4537 | | 0.219 |
| SiC | 1000 | 0.782 | 0.5513 | 0.4747 | | 0.307 |
| SiBP | 7500 | 0.910 | 0.5808 | 0.4688 | 0.5724 | 0.441 |

It will be noted from Table 1, when the load changes from 3N to 10N, SrSiON presents the smallest change in the friction coefficient among these materials.

In the aforementioned embodiment, each thin-film magnetic head is constituted by a GMR read head element and an inductive write head element. However, in modifications, each thin-film magnetic head may be constituted by only a GMR read head element or a TMR read head element, or by only an inductive write head element.

Hereinafter, a manufacturing method of the multi-channel thin-film magnetic head according to the present invention will be described.

FIG. 7 illustrates a flow of an example of a manufacturing process of the multi-channel thin-film magnetic head shown in FIG. 1, and FIGS. 8a to 8e illustrate a part, particularly a machining process part, of the manufacturing process of FIG. 7.

As shown in FIG. 7, first, a large number of GMR read head elements and/or inductive write head elements are formed on a wafer that constitutes a head substrate (Step S70).

Figure 8A:
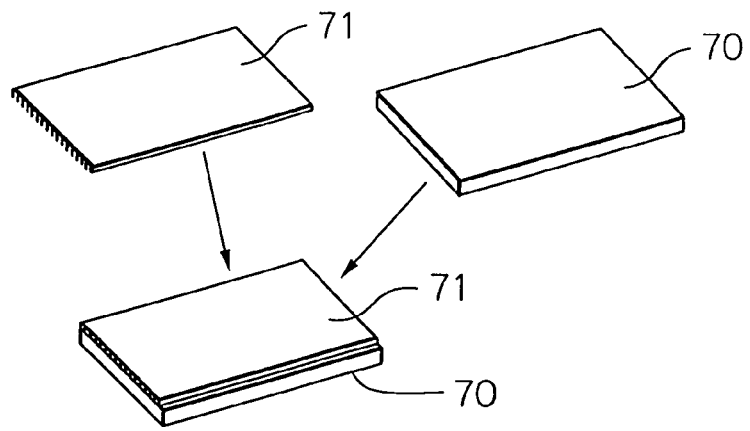
FIGS. 8a to 8e is perspective views illustrating a part of the manufacturing process of FIG. 7.

Then, the wafer is cut into a rectangular plane shape, and then a closure substrate 71 also cut into a rectangular plane shape is fixed to the cut wafer 70 by using an epoxy family adhesion and by curing the adhesion, as shown in FIG. 8a (Step S71). In modifications, a wafer with many GMR read head elements only is cut into a rectangular plane shape, a wafer with many inductive write head elements only is cut into a rectangular plane shape, and then these cut wafers may be adhered to a closure substrate also cut into a rectangular plane shape.

Figure 8B:
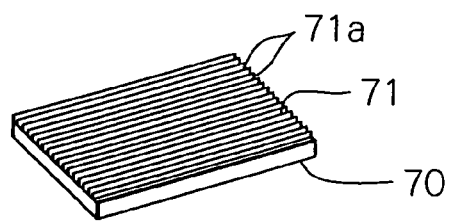

Then, as shown in FIG. 8b, cutting grooves 71a are formed on a surface of the closure substrate 71 (Step S72).

Figure 8C:
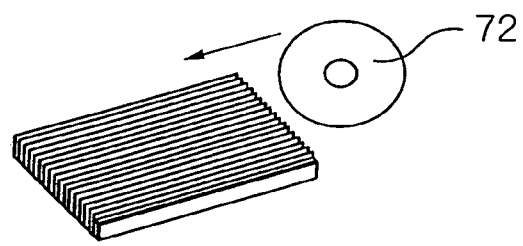

Then, as shown in FIG. 8c, the wafer 70 and the closure substrate 71 fixed to each other are cut to separate them into a plurality of row bars 73 using a slicing wheel 72 (Step S73). Each row bar 73 corresponds to each multi-channel thin-film magnetic head.

Figure 8D:
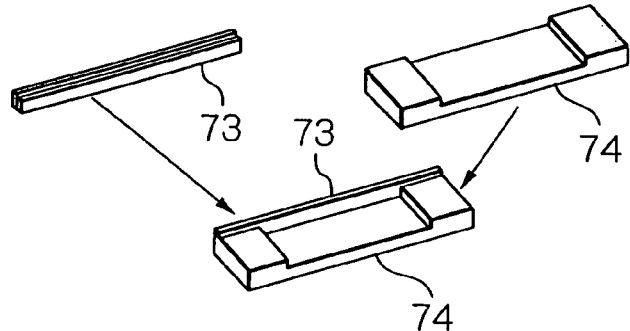
Figure 8E:
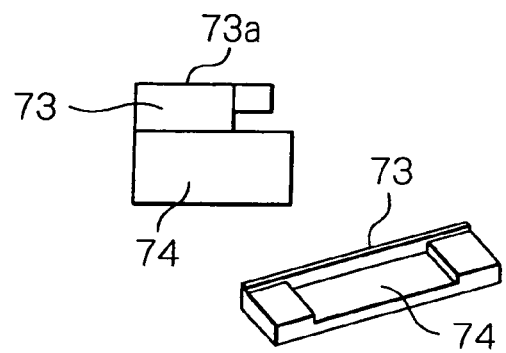

Then, as shown in FIG. 8d, each row bar 73 is temporally fixed to a lapping jig or a U-beam 74 (Step S74), and then, as shown in FIG. 8e, a TBS 73a of the row bar 73 is lapped (Step S75).

Then, a recess part is formed in the TBS of the GMR read head elements and/or the inductive write head elements of the row bar 73 by performing ion milling for example (Step S76).

Thereafter, a protection film 56 is deposited over the whole area of the TBS 73a of the row bar 73 (Step S77). As for a material of the protection film 56, DLC, $Al_2O_3$, or SiON family material such as for example SiON, LaSiON, HfSiON, AlSiON or SrSiON is used as aforementioned.

Then, many micro-grooves or many flaws 57 running in random directions are formed on a surface of the protection film 56 by performing ion milling or RIE (reactive ion etching) (Step S78).

Then, a lubricant agent is filled in the micro-grooves 57 by dipping this state row bar 73 into a lubricant liquid (Step S79). As for the lubricant agent, fluorine or higher fatty acid for example is used.

Thereafter, the row bar 73 is detached from the lapping jig 74, and then a magnetization process and a test process of the GMR read head elements are performed to provide a multi-channel thin-film magnetic head.

FIG. 9 illustrates a flow of another example of a manufacturing process of the multi-channel thin-film magnetic head shown in FIG. 1, and FIGS. 10a to 10d illustrate modifications of a part, particularly a machining process part, of the manufacturing process of FIG. 9.

As shown in FIG. 9, first, a large number of GMR read head elements and/or inductive write head elements are formed on a wafer that constitutes a head substrate (Step S90).

Figure 10A:
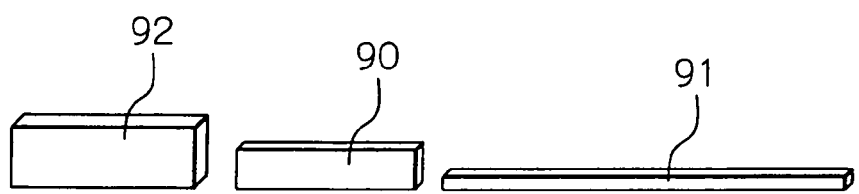
FIGS. 10a to 10d is perspective views illustrating modifications of a part of the manufacturing process of FIG. 9.

Then, the wafer is cut to separate into chip bars 90 shown in FIG. 10a (Step S91). Each chip bar 90 corresponds to each multi-channel thin-film magnetic head. In modifications, a wafer with many GMR read head elements only is cut to separate into rectangular plane shaped chips, a wafer with many inductive write head elements only is cut to separate into rectangular plane shaped chips, and then these cut chips may be adhered to each other to form the chip bar.

On the other hand, a closure substrate is cut to separate into closure bars 91 as shown in FIG. 10a (Step S92).

Figure 10B:
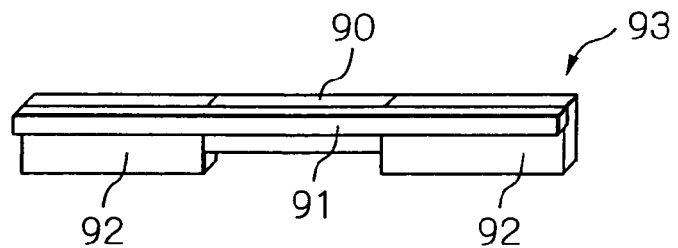

Also, two of bar end 92 shown in FIG. 10a are prepared, and then, as shown in FIG. 10b, the chip bar 90, the closure bar 91 and the two bar ends 92 are fixed to each other by using an epoxy family adhesion and by curing the adhesion to obtain a row bar 93 (Step S93).

Figure 10C:
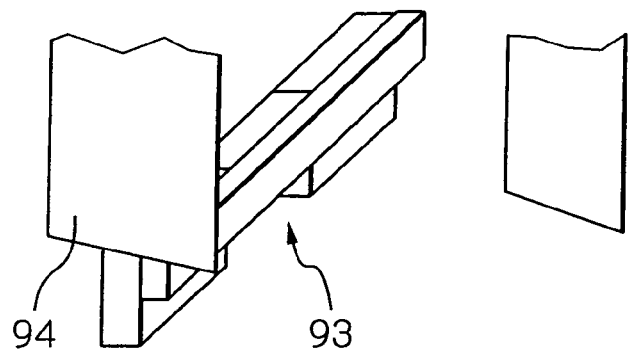

Then, as shown in FIG. 10c, ends of the row bar 93 obtained thus fixed are chamfered using a wheel 94 (Step S94).

Figure 10D:
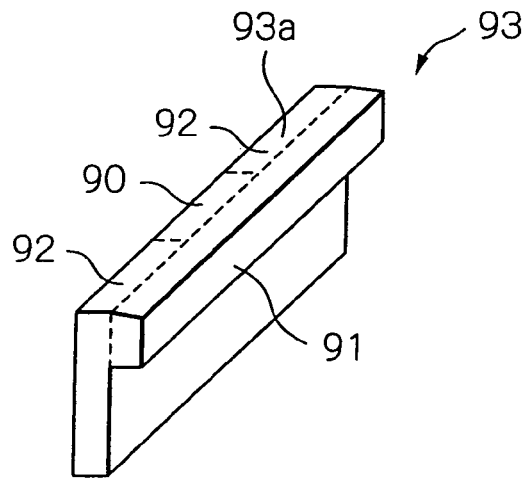

Then, each row bar 93 is temporally fixed to a lapping jig (not shown), and then, as shown in FIG. 10d, a TBS 93a of the row bar 93 is lapped (Step S95).

Then, a recess part is formed in the TBS of the GMR read head elements and/or the inductive write head elements of the row bar 93 by performing ion milling for example (Step S96).

Thereafter, a protection film 56 is deposited over the whole area of the TBS 93a of the row bar 93 (Step S97). As for a material of the protection film 56, DLC, $Al_2O_3$, or SiON family material such as for example SiON, LaSiON, HfSiON, AlSiON or SrSiON is used as aforementioned.

Then, many micro-grooves or many flaws 57 running in random directions are formed on a surface of the protection film 56 by performing ion milling or RIE (Step S98).

Then, a lubricant agent is filled in the micro-grooves 57 by dipping this state row bar 93 into a lubricant liquid (Step S99). As for the lubricant agent, fluorine or higher fatty acid for example is used.

Thereafter, the row bar 93 is detached from the lapping jig, and then a magnetization process and a test process of the GMR read head elements are performed to provide a multi-channel thin-film magnetic head.

FIG. 11 illustrates a flow of further example of a manufacturing process of the multi-channel thin-film magnetic head shown in FIG. 1. A machining process part in this example is similar to that shown in FIGS. 8a to 8e. Thus, the following description will executed with reference to FIGS. 8a to 8e.

As shown in FIG. 11, first, a large number of GMR read head elements and/or inductive write head elements are formed on a wafer that constitutes a head substrate (Step S110).

Then, the wafer is cut into a rectangular plane shape, and then a closure substrate 71 also cut into a rectangular plane shape is fixed to the cut wafer 70 by using an epoxy family adhesion and by curing the adhesion, as shown in FIG. 8a (Step S111). In modifications, a wafer with many GMR read head elements only is cut into a rectangular plane shape, a wafer with many inductive write head elements only is cut into a rectangular plane shape, and then these cut wafers may be adhered to a closure substrate also cut into a rectangular plane shape.

Then, as shown in FIG. 8b, cutting grooves 71a are formed on a surface of the closure substrate 71 (Step S112).

Then, as shown in FIG. 8c, the wafer 70 and the closure substrate 71 fixed to each other are cut to separate them into a plurality of row bars 73 using a slicing wheel 72 (Step S113). Each row bar 73 corresponds to each multi-channel thin-film magnetic head.

Then, as shown in FIG. 8d, each row bar 73 is temporally fixed to a lapping jig or a U-beam 74 (Step S114), and then, as shown in FIG. 8e, a TBS 73a of the row bar 73 is lapped (Step S115).

Then, a recess part is formed in the TBS of the GMR read head elements and/or the inductive write head elements of the row bar 73 by performing ion milling for example (Step S116).

Thereafter, a protection film 56 is deposited over the whole area of the TBS 73a of the row bar 73 (Step S117). As for a material of the protection film 56, DLC, $Al_2O_3$, or SiON family material such as for example SiON, LaSiON, HfSiON, AlSiON or SrSiON is used as aforementioned.

Then, many micro-grooves or many scratches 57 running in random directions are formed on a surface of the protection film 56 by performing surface lapping (Step S118).

Then, a lubricant agent is filled in the micro-grooves 57 by dipping this state row bar 73 into a lubricant liquid (Step S119). As for the lubricant agent, fluorine or higher fatty acid for example is used.

Thereafter, the row bar 73 is detached from the lapping jig 74, and then a magnetization process and a test process of the GMR read head elements are performed to provide a multi-channel thin-film magnetic head.

Figure 12:
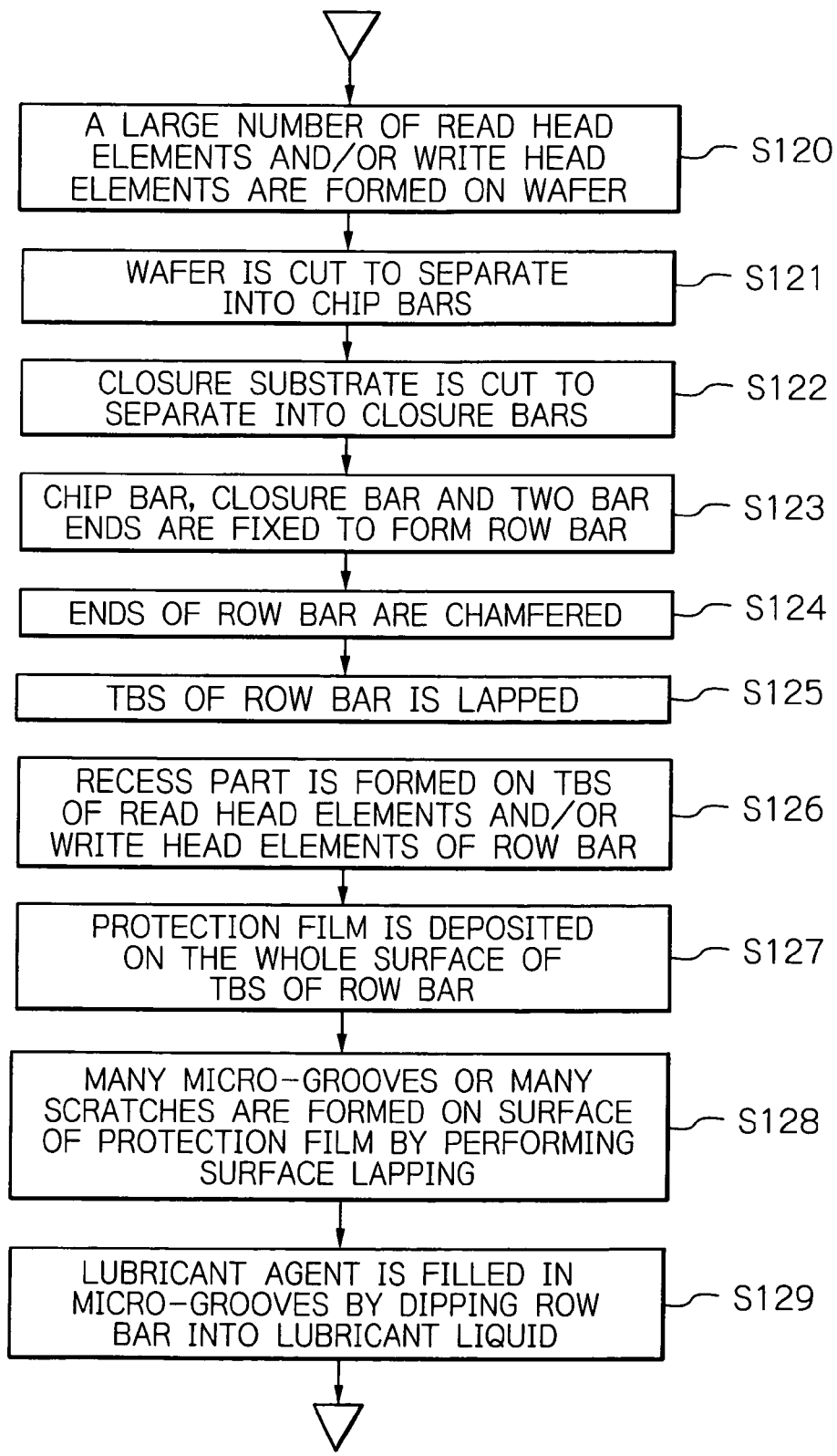
FIG. 12 is a flow chart illustrating still further example of a manufacturing process of the multi-channel thin-film magnetic head shown in FIG. 1.

FIG. 12 illustrates a flow of still further example of a manufacturing process of the multi-channel thin-film magnetic head shown in FIG. 1. A machining process part in this example is similar to that shown in FIGS. 10a to 10d. Thus, the following description will executed with reference to FIGS. 10a to 10d.

As shown in FIG. 12, first, a large number of GMR read head elements and/or inductive write head elements are formed on a wafer that constitutes a head substrate (Step S120).

Then, the wafer is cut to separate into chip bars 90 shown in FIG. 10a (Step S121). Each chip bar 90 corresponds to each multi-channel thin-film magnetic head. In modifications, a wafer with many GMR read head elements only is cut to separate into rectangular plane shaped chips, a wafer with many inductive write head elements only is cut to separate into rectangular plane shaped chips, and then these cut chips may be adhered to each other to form the chip bar.

On the other hand, a closure substrate is cut to separate into closure bars 91 as shown in FIG. 10a (Step S122).

Also, two of bar end 92 shown in FIG. 10a are prepared, and then, as shown in FIG. 10b, the chip bar 90, the closure bar 91 and the two bar ends 92 are fixed to each other by using an epoxy family adhesion and by curing the adhesion to obtain a row bar 93 (Step S123).

Then, as shown in FIG. 10c, ends of the row bar 93 obtained thus fixed are chamfered using a wheel 94 (Step S124).

Then, each row bar 93 is temporally fixed to a lapping jig (not shown), and then, as shown in FIG. 10d, a TBS 93a of the row bar 93 is lapped (Step S125).

Then, a recess part is formed in the TBS of the GMR read head elements and/or the inductive write head elements of the row bar 93 by performing ion milling for example (Step S126).

Thereafter, a protection film 56 is deposited over the whole area of the TBS 93a of the row bar 93 (Step S127). As for a material of the protection film 56, DLC, $Al_2O_3$, or SiON family material such as for example SiON, LaSiON, HfSiON, AlSiON or SrSiON is used as aforementioned.

Then, many micro-grooves or many scratches 57 running in random directions are formed on a surface of the protection film 56 by performing surface lapping (Step S128).

Then, a lubricant agent is filled in the micro-grooves 57 by dipping this state row bar 93 into a lubricant liquid (Step S129). As for the lubricant agent, fluorine or higher fatty acid for example is used.

Thereafter, the row bar 93 is detached from the lapping jig, and then a magnetization process and a test process of the GMR read head elements are performed to provide a multi-channel thin-film magnetic head.

Figure 13:
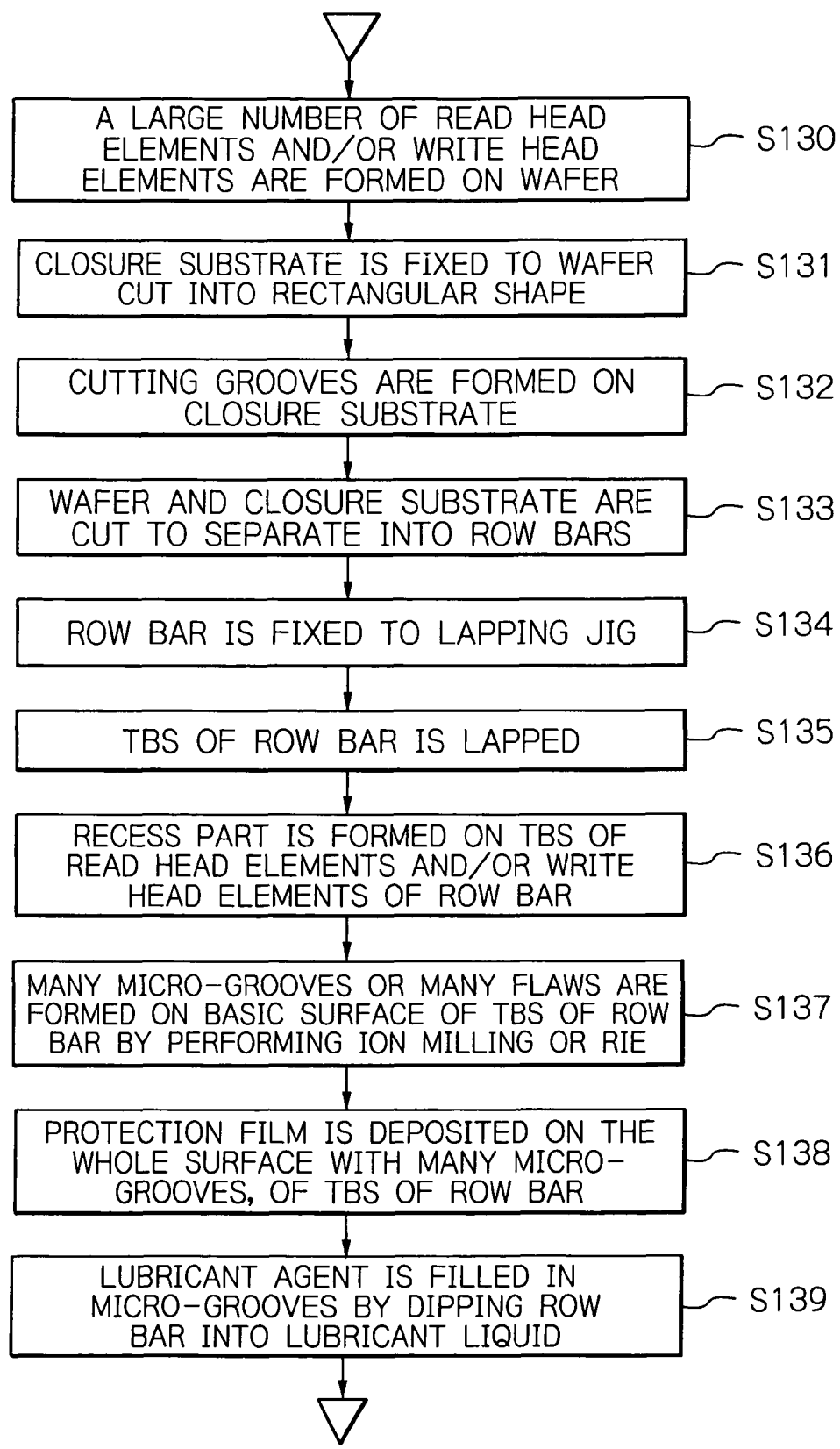
FIG. 13 is a flow chart illustrating further example of a manufacturing process of the multi-channel thin-film magnetic head shown in FIG. 1.

FIG. 13 illustrates a flow of further example of a manufacturing process of the multi-channel thin-film magnetic head shown in FIG. 1. A machining process part in this example is similar to that shown in FIGS. 8a to 8e. Thus, the following description will executed with reference to FIGS. 8a to 8e.

As shown in FIG. 13, first, a large number of GMR read head elements and/or inductive write head elements are formed on a wafer that constitutes a head substrate (Step S130).

Then, the wafer is cut into a rectangular plane shape, and then a closure substrate 71 also cut into a rectangular plane shape is fixed to the cut wafer 70 by using an epoxy family adhesion and by curing the adhesion, as shown in FIG. 8a (Step S131). In modifications, a wafer with many GMR read head elements only is cut into a rectangular plane shape, a wafer with many inductive write head elements only is cut into a rectangular plane shape, and then these cut wafers may be adhered to a closure substrate also cut into a rectangular plane shape.

Then, as shown in FIG. 8b, cutting grooves 71a are formed on a surface of the closure substrate 71 (Step S132).

Then, as shown in FIG. 8c, the wafer 70 and the closure substrate 71 fixed to each other are cut to separate them into a plurality of row bars 73 using a slicing wheel 72 (Step S133). Each row bar 73 corresponds to each multi-channel thin-film magnetic head.

Then, as shown in FIG. 8d, each row bar 73 is temporally fixed to a lapping jig or a U-beam 74 (Step S134), and then, as shown in FIG. 8e, a TBS 73a of the row bar 73 is lapped (Step S135).

Then, a recess part is formed in the TBS of the GMR read head elements and/or the inductive write head elements of the row bar 73 by performing ion milling for example (Step S136).

Thereafter, many micro-grooves or many flaws running in random directions are formed on a basic surface of the TBS 73a of the row bar 73 by performing ion milling or RIE (Step S137).

Then, a protection film 56 is deposited over the whole area of the TBS 73a of the row bar 73, on which the many micro-grooves or many flaws are formed. Thus, the many micro-grooves or many flaws running in random directions are appeared on a surface of the protection film 56 (Step S138). As for a material of the protection film 56, DLC, $Al_2O_3$, or SiON family material such as for example SiON, LaSiON, HfSiON, AlSiON or SrSiON is used as aforementioned.

Then, a lubricant agent is filled in the micro-grooves 57 by dipping this state row bar 73 into a lubricant liquid (Step S139). As for the lubricant agent, fluorine or higher fatty acid for example is used.

Thereafter, the row bar 73 is detached from the lapping jig 74, and then a magnetization process and a test process of the GMR read head elements are performed to provide a multi-channel thin-film magnetic head.

Figure 14:
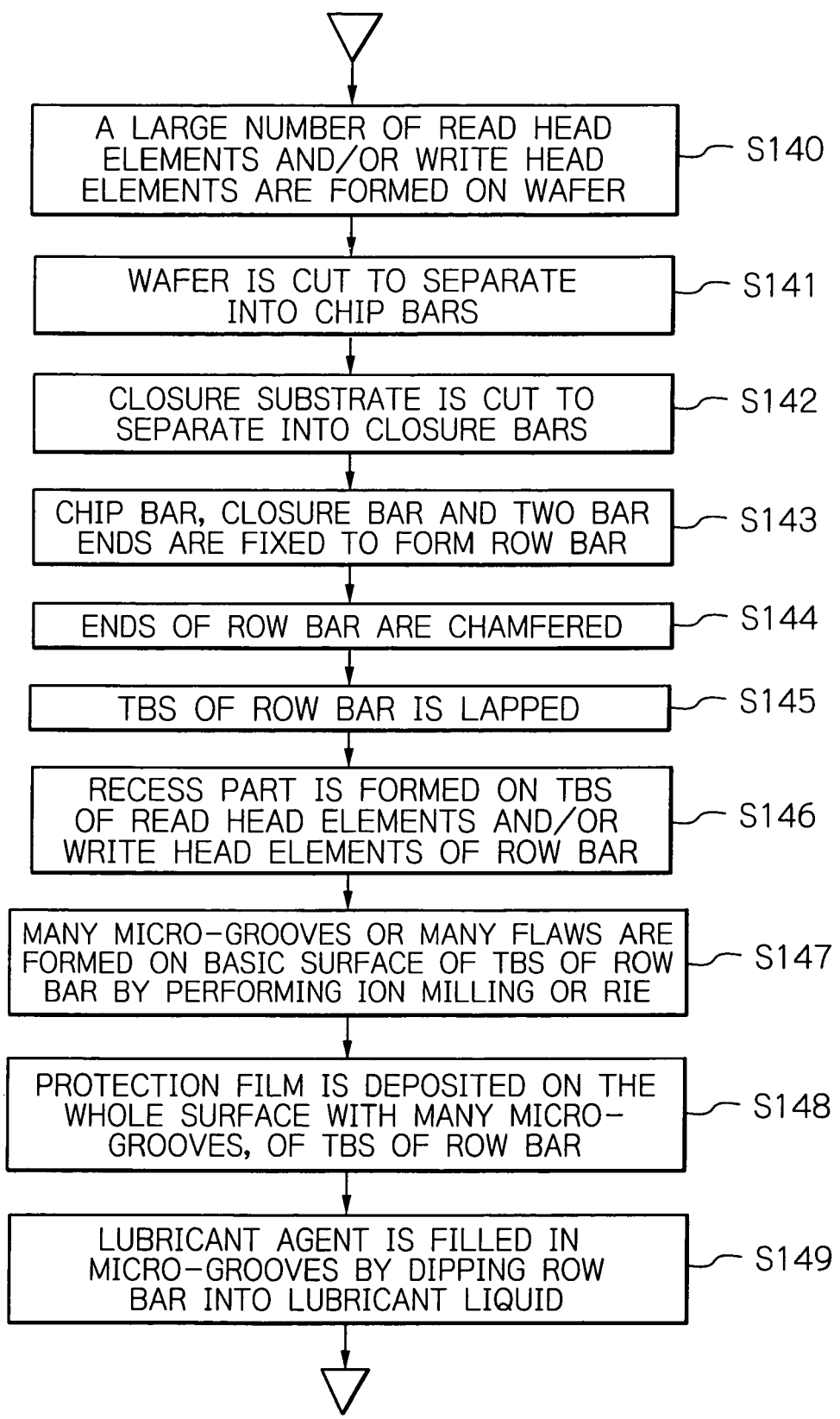
FIG. 14 is a flow chart illustrating still further example of a manufacturing process of the multi-channel thin-film magnetic head shown in FIG. 1.

FIG. 14 illustrates a flow of still further example of a manufacturing process of the multi-channel thin-film magnetic head shown in FIG. 1. A machining process part in this example is similar to that shown in FIGS. 10a to 10d. Thus, the following description will executed with reference to FIGS. 10a to 10d.

As shown in FIG. 14, first, a large number of GMR read head elements and/or inductive write head elements are formed on a wafer that constitutes a head substrate (Step S140).

Then, the wafer is cut to separate into chip bars 90 shown in FIG. 10a (Step S141). Each chip bar 90 corresponds to each multi-channel thin-film magnetic head. In modifications, a wafer with many GMR read head elements only is cut to separate into rectangular plane shaped chips, a wafer with many inductive write head elements only is cut to separate into rectangular plane shaped chips, and then these cut chips may be adhered to each other to form the chip bar.

On the other hand, a closure substrate is cut to separate into closure bars 91 as shown in FIG. 10a (Step S142).

Also, two of bar end 92 shown in FIG. 10a are prepared, and then, as shown in FIG. 10b, the chip bar 90, the closure bar 91 and the two bar ends 92 are fixed to each other by using an epoxy family adhesion and by curing the adhesion to obtain a row bar 93 (Step S143).

Then, as shown in FIG. 10c, ends of the row bar 93 obtained thus fixed are chamfered using a wheel 94 (Step S144).

Then, each row bar 93 is temporally fixed to a lapping jig (not shown), and then, as shown in FIG. 10d, a TBS 93a of the row bar 93 is lapped (Step S145).

Then, a recess part is formed in the TBS of the GMR read head elements and/or the inductive write head elements of the row bar 93 by performing ion milling for example (Step S146).

Thereafter, many micro-grooves or many flaws running in random directions are formed on a basic surface of the TBS 73a of the row bar 73 by performing ion milling or RIE (Step S147).

Then, a protection film 56 is deposited over the whole area of the TBS 73a of the row bar 73, on which the many micro-grooves or many flaws are formed. Thus, the many micro-grooves or many flaws running in random directions are appeared on a surface of the protection film 56 (Step S148). As for a material of the protection film 56, DLC, $Al_2O_3$, or SiON family material such as for example SiON, LaSiON, HfSiON, AlSiON or SrSiON is used as aforementioned.

Then, a lubricant agent is filled in the micro-grooves 57 by dipping this state row bar 93 into a lubricant liquid (Step S149). As for the lubricant agent, fluorine or higher fatty acid for example is used.

Thereafter, the row bar 93 is detached from the lapping jig, and then a magnetization process and a test process of the GMR read head elements are performed to provide a multi-channel thin-film magnetic head.

FIG. 15 illustrates a flow of further example of a manufacturing process of the multi-channel thin-film magnetic head shown in FIG. 1. A machining process part in this example is similar to that shown in FIGS. 8a to 8e. Thus, the following description will executed with reference to FIGS. 8a to 8e.

As shown in FIG. 15, first, a large number of GMR read head elements and/or inductive write head elements are formed on a wafer that constitutes a head substrate (Step S150).

Then, the wafer is cut into a rectangular plane shape, and then a closure substrate 71 also cut into a rectangular plane shape is fixed to the cut wafer 70 by using an epoxy family adhesion and by curing the adhesion, as shown in FIG. 8a (Step S151). In modifications, a wafer with many GMR read head elements only is cut into a rectangular plane shape, a wafer with many inductive write head elements only is cut into a rectangular plane shape, and then these cut wafers may be adhered to a closure substrate also cut into a rectangular plane shape.

Then, as shown in FIG. 8b, cutting grooves 71a are formed on a surface of the closure substrate 71 (Step S152).

Then, as shown in FIG. 8c, the wafer 70 and the closure substrate 71 fixed to each other are cut to separate them into a plurality of row bars 73 using a slicing wheel 72 (Step S153). Each row bar 73 corresponds to each multi-channel thin-film magnetic head.

Then, as shown in FIG. 8d, each row bar 73 is temporally fixed to a lapping jig or a U-beam 74 (Step S154), and then, as shown in FIG. 8e, a TBS 73a of the row bar 73 is lapped (Step S155).

Then, a recess part is formed in the TBS of the GMR read head elements and/or the inductive write head elements of the row bar 73 by performing ion milling for example (Step S156).

Thereafter, a protection film 56 is deposited over the whole area of the TBS 73a of the row bar 73 using a plurality of targets made of a plurality of different kinds of materials so as to control the growth of crystal grains. Thus, many micro-grooves or many scratches 57 running in random directions are automatically formed on a surface of the protection film 56 (Step S157). As for materials of the protection film 56, a plurality of kinds of DLC, $Al_2O_3$, or SiON family material such as for example SiON, LaSiON, HfSiON, AlSiON or SrSiON are used.

Then, a lubricant agent is filled in the micro-grooves 57 by dipping this state row bar 73 into a lubricant liquid (Step S158). As for the lubricant agent, fluorine or higher fatty acid for example is used.

Thereafter, the row bar 73 is detached from the lapping jig 74, and then a magnetization process and a test process of the GMR read head elements are performed to provide a multi-channel thin-film magnetic head.

FIG. 16 illustrates a flow of still further example of a manufacturing process of the multi-channel thin-film magnetic head shown in FIG. 1. A machining process part in this example is similar to that shown in FIGS. 10a to 10d. Thus, the following description will executed with reference to FIGS. 10a to 10d.

As shown in FIG. 16, first, a large number of GMR read head elements and/or inductive write head elements are formed on a wafer that constitutes a head substrate (Step S160).

Then, the wafer is cut to separate into chip bars 90 shown in FIG. 10a (Step S161). Each chip bar 90 corresponds to each multi-channel thin-film magnetic head. In modifications, a wafer with many GMR read head elements only is cut to separate into rectangular plane shaped chips, a wafer with many inductive write head elements only is cut to separate into rectangular plane shaped chips, and then these cut chips may be adhered to each other to form the chip bar.

On the other hand, a closure substrate is cut to separate into closure bars 91 as shown in FIG. 10a (Step S162).

Also, two of bar end 92 shown in FIG. 10a are prepared, and then, as shown in FIG. 10b, the chip bar 90, the closure bar 91 and the two bar ends 92 are fixed to each other by using an epoxy family adhesion and by curing the adhesion to obtain a row bar 93 (Step S163).

Then, as shown in FIG. 10c, ends of the row bar 93 obtained thus fixed are chamfered using a wheel 94 (Step S164).

Then, each row bar 93 is temporally fixed to a lapping jig (not shown), and then, as shown in FIG. 10d, a TBS 93a of the row bar 93 is lapped (Step S165).

Then, a recess part is formed in the TBS of the GMR read head elements and/or the inductive write head elements of the row bar 93 by performing ion milling for example (Step S166).

Thereafter, a protection film 56 is deposited over the whole area of the TBS 73a of the row bar 73 using a plurality of targets made of a plurality of different kinds of materials so as to control the growth of crystal grains. Thus, many micro-grooves or many scratches 57 running in random directions are automatically formed on a surface of the protection film 56 (Step S167). As for materials of the protection film 56, a plurality of kinds of DLC, $Al_2O_3$, or SiON family material such as for example SiON, LaSiON, HfSiON, AlSiON or SrSiON are used.

Then, a lubricant agent is filled in the micro-grooves 57 by dipping this state row bar 93 into a lubricant liquid (Step S168). As for the lubricant agent, fluorine or higher fatty acid for example is used.

Thereafter, the row bar 93 is detached from the lapping jig, and then a magnetization process and a test process of the GMR read head elements are performed to provide a multi-channel thin-film magnetic head.

As aforementioned, various methods can be adopted as the method for forming many micro-grooves running in random directions on a surface of the protection film. Also, at least two of the methods shown in FIGS. 7, 11, 13 and 15 may be combined with each other, or at least two of the methods shown in FIGS. 9, 12, 14 and 16 may be combined with each other.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A multi-channel thin-film magnetic head comprising:
   a substrate;
   a plurality of thin-film magnetic head elements formed on said substrate;
   a closure fixed onto said plurality of thin-film magnetic head elements;
   a protection film laminated on a whole area of a tape bearing surface of said plurality of thin-film magnetic head elements and said closure; and
   many micro-grooves formed in a surface of said protection film.

2. The multi-channel thin-film magnetic head as claimed in claim 1, wherein said many micro-grooves comprise many micro-grooves running in random directions.

3. The multi-channel thin-film magnetic head as claimed in claim 1, wherein said multi-channel thin-film magnetic head further comprises a lubricant agent filled in said many micro-grooves.

4. The multi-channel thin-film magnetic head as claimed in claim 3, wherein said lubricant agent comprises fluorine or higher fatty acid.

5. The multi-channel thin-film magnetic head as claimed in claim 1, wherein said protection film is made of DLC, $Al_2O_3$, SiON, LaSiON, HfSiON, AlSiON or SrSiON.

6. The multi-channel thin-film magnetic head as claimed in claim 1, wherein said plurality of thin-film magnetic head elements comprise a plurality of magnetoresistive effect read head elements and/or a plurality of inductive write head elements.

7. The multi-channel thin-film magnetic head as claimed in claim 6, wherein each of said plurality of magnetoresistive effect read head elements comprises a giant magnetoresistive effect read head element or a tunnel magnetoresistive effect read head element.

8. A multi-channel magnetic tape drive apparatus including a multi-channel thin-film magnetic head, a magnetic tape facing to said multi-channel thin-film magnetic head, and a drive system for relatively moving said magnetic tape and said multi-channel thin-film magnetic head,
   said multi-channel thin-film magnetic head comprising:
   a substrate;
   a plurality of thin-film magnetic head elements formed on said substrate;
   a closure fixed onto said plurality of thin-film magnetic head elements;
   a protection film laminated on a whole area of a tape bearing surface of said plurality of thin-film magnetic head elements and said closure; and
   many micro-grooves formed in a surface of said protection film.

9. The multi-channel magnetic tape drive apparatus as claimed in claim 8, wherein said many micro-grooves comprise many micro-grooves running in random directions.

10. The multi-channel magnetic tape drive apparatus as claimed in claim 8, wherein said multi-channel thin-film magnetic head further comprises a lubricant agent filled in said many micro-grooves.

11. The multi-channel magnetic tape drive apparatus as claimed in claim 10, wherein said lubricant agent comprises fluorine or higher fatty acid.

12. The multi-channel magnetic tape drive apparatus as claimed in claim 8, wherein said protection film is made of DLC, $Al_2O_3$, SiON, LaSiON, HfSiON, AlSiON or SrSiON.

13. The multi-channel magnetic tape drive apparatus as claimed in claim 8, wherein said plurality of thin-film magnetic head elements comprise a plurality of magnetoresistive effect read head elements and/or a plurality of inductive write head elements.

14. The multi-channel magnetic tape drive apparatus as claimed in claim 13, wherein each of said plurality of magnetoresistive effect read head elements comprises a giant magnetoresistive effect read head element or a tunnel magnetoresistive effect read head element.

15. A manufacturing method of a multi-channel thin-film magnetic head, comprising the steps of:
   forming a plurality of thin-film magnetic head elements formed on a substrate;
   fixing a closure fixed onto said plurality of thin-film magnetic head elements of said substrate;
   forming a row bar with the thin-film magnetic head elements aligned along a longitudinal direction of said row bar, by cutting said substrate and said closure fixed to said substrate; and
   forming a protection film on a whole area of a tape bearing surface of said row bar, many micro-grooves running in random directions being formed on a surface of said protection film.

16. The manufacturing method as claimed in claim 15, wherein the protection film forming step comprises forming many micro-grooves on a basic surface of said tape bearing surface by performing etching, and forming the many micro-grooves on the surface of said protection film by depositing the protection film on said basic surface with the formed many micro-grooves.

17. The manufacturing method as claimed in claim 15, wherein the protection film forming step comprises depositing a protection film using a plurality of targets made of a plurality of different kinds of materials to control the growth of crystal grains so as to form the many micro-grooves on the surface of said protection film.

18. The manufacturing method as claimed in claim 15, wherein the protection film forming step comprises depositing a protection film, and then forming the many micro-grooves on the surface of the deposited protection film by performing ion milling or etching.

19. The manufacturing method as claimed in claim 15, wherein the protection film forming step comprises depositing a protection film, and then forming the many micro-grooves on the surface of the deposited protection film by performing surface lapping.

20. The manufacturing method as claimed in claim 15, wherein said manufacturing method further comprises a step of filling a lubricant agent in said many micro-grooves.

21. The manufacturing method as claimed in claim 20, wherein said lubricant agent comprises fluorine or higher fatty acid.

22. The manufacturing method as claimed in claim 15, wherein said protection film is made of DLC, $Al_2O_3$, SiON, LaSiON, HfSiON, AlSiON or SrSiON.

23. A manufacturing method of a multi-channel thin-film magnetic head, comprising the steps of:
- forming a plurality of thin-film magnetic head elements formed on a substrate;
- forming a chip bar with the thin-film magnetic head elements aligned along a longitudinal direction of said chip bar, by cutting said substrate;
- fixing a closure bar to said chip bar to form a row bar; and
- forming a protection film on a whole area of a tape bearing surface of said row bar, many micro-grooves running in random directions being formed on a surface of said protection film.

24. The manufacturing method as claimed in claim 23, wherein the protection film forming step comprises forming many micro-grooves on a basic surface of said tape bearing surface by performing etching, and forming the many micro-grooves on the surface of said protection film by depositing the protection film on said basic surface with the formed many micro-grooves.

25. The manufacturing method as claimed in claim 23, wherein the protection film forming step comprises depositing a protection film using a plurality of targets made of a plurality of different kinds of materials to control the growth of crystal grains so as to form the many micro-grooves on the surface of said protection film.

26. The manufacturing method as claimed in claim 23, wherein the protection film forming step comprises depositing a protection film, and then forming the many micro-grooves on the surface of the deposited protection film by performing ion milling or etching.

27. The manufacturing method as claimed in claim 23, wherein the protection film forming step comprises depositing a protection film, and then forming the many micro-grooves on the surface of the deposited protection film by performing surface lapping.

28. The manufacturing method as claimed in claim 23, wherein said manufacturing method further comprises a step of filling a lubricant agent in said many micro-grooves.

29. The manufacturing method as claimed in claim 28, wherein said lubricant agent comprises fluorine or higher fatty acid.

30. The manufacturing method as claimed in claim 23, wherein said protection film is made of DLC, $Al_2O_3$, SiON, LaSiON, HfSiON, AlSiON or SrSiON.

* * * * *